United States Patent
Hatakeyama

(10) Patent No.: US 7,054,834 B2
(45) Date of Patent: May 30, 2006

(54) ONLINE DISTRIBUTION SYSTEM AND METHOD

(75) Inventor: Koichi Hatakeyama, Tokyo (JP)

(73) Assignee: NEC Corporation, Tokyo (JP)

( * ) Notice: Subject to any disclaimer, the term of this patent is extended or adjusted under 35 U.S.C. 154(b) by 634 days.

(21) Appl. No.: 09/824,034

(22) Filed: Apr. 3, 2001

(65) Prior Publication Data

US 2002/0002498 A1    Jan. 3, 2002

(30) Foreign Application Priority Data

Apr. 11, 2000  (JP)  ............................. 2000-109688

(51) Int. Cl.
  *G06Q 30/00* (2006.01)
  *G06F 17/30* (2006.01)
(52) U.S. Cl. ............................. 705/26; 705/27; 705/16
(58) Field of Classification Search ................. 705/16, 705/26, 27
  See application file for complete search history.

(56) References Cited

U.S. PATENT DOCUMENTS

| | | | | |
|---|---|---|---|---|
| 5,734,719 A | * | 3/1998 | Tsevdos et al. | 700/234 |
| 5,740,134 A | * | 4/1998 | Peterson | 700/234 |
| 5,862,104 A | * | 1/1999 | Matsumoto | 369/7 |
| 5,963,916 A | * | 10/1999 | Kaplan | 705/26 |
| 6,021,439 A | * | 2/2000 | Turek et al. | 709/224 |
| 6,026,445 A | * | 2/2000 | Kephart et al. | 709/245 |
| 6,029,182 A | * | 2/2000 | Nehab et al. | 715/523 |
| 6,045,048 A | * | 4/2000 | Wilz et al. | 235/472.01 |
| 6,247,130 B1 | * | 6/2001 | Fritsch | 713/171 |
| 6,248,946 B1 | * | 6/2001 | Dwek | 84/609 |
| 6,330,490 B1 | * | 12/2001 | Kim et al. | 700/234 |
| 6,366,914 B1 | * | 4/2002 | Stern | 707/10 |
| 6,504,089 B1 | * | 1/2003 | Negishi et al. | 84/609 |
| 6,553,404 B1 | * | 4/2003 | Stern | 709/203 |
| 6,587,837 B1 | * | 7/2003 | Spagna et al. | 705/26 |
| 6,674,993 B1 | * | 1/2004 | Tarbouriech | 455/2.01 |
| 6,799,165 B1 | * | 9/2004 | Boesjes | 705/28 |
| 2002/0023028 A1 | * | 2/2002 | Quarendon et al. | 705/26 |
| 2002/0073098 A1 | * | 6/2002 | Zhang et al. | 707/104.1 |

(Continued)

FOREIGN PATENT DOCUMENTS

CA       2225190 A   *   6/1999

(Continued)

OTHER PUBLICATIONS

Finnneran, M., "The Big Story—It's All the Same Thing," Business Communications Review, vol. 99, No. 7, p. 24, Jul., 1999.*

(Continued)

*Primary Examiner*—Nicholas D. Rosen
(74) *Attorney, Agent, or Firm*—Whitham, Curtis, Christofferson & Cook, PC

(57) ABSTRACT

An online distribution system by which the time required for a downloading procedure in a shop can be performed in a short time by a download terminal connected to a search server through a data distribution server which is connectable to a personal terminal. The search server stores a plurality of titles of distribution information, searches the titles for a title designated for subscription from the personal terminal, and stores the searched out title and identification information transmitted from the personal terminal. The download terminal acquires identification information inputted from the outside, reads out, based on the acquired identification information, the title which corresponds to the identification information from the search server, reads out the distribution information corresponding to the read out title from the data distribution server, and records the read out distribution information onto a recording medium.

2 Claims, 1 Drawing Sheet

U.S. PATENT DOCUMENTS

2003/0221113 A1* 11/2003 Kupka et al. .............. 713/189

FOREIGN PATENT DOCUMENTS

JP         11-143719       5/1999
JP         11-185381       7/1999

OTHER PUBLICATIONS

Brown, "Oracle, IBM Foray into New Markets," (Abstract only), Network World, vol. 10, No. 20, p. 6, May 17, 1993.*
Goodman, C.K., "IBM, Blockbuster Pushing Ahead," Miami Daily Business Review, S. 1, p. 1, Aug. 17, 1993.*
Anon., "IBM Updates Digital Library," ENT, p. 041, Oct. 22, 1997.*
Anon., "MP3.com," IPO Reporter, The, Jul. 19, 1999.*
Anon., "Cell Phone Capable of Functioning as a Portbale Audio Player," Mobile Media Magazine vol. 8, No. 2, pp. 46-47, Jan. 13, 2000 (translation).*
Lake, D., "Internet Distribution of Music Data Is the Trigger to the Rapidly Growing Contents Distribution," Nikkei Network Business, Japan, Nikkei BP Co., vol. 54, pp. 136-139, Dec. 15, 1999 (translation).*
Homma et al., "Record Companies Also Embarked on Internet Music Data Distribution, Heated Year End Sales Battle," Nikkei Network Business, Japan, Nikkei BP Co., No. 49, pp. 70-71, Jul. 15, 1999 (translation).*
Anon., "Digicube: Music Distribution Business Based in Convenience Stores," Nikkei Network Business, Japan, Nikkei BP Co., No. 52, p. 13, Oct. 15, 1999 (translation).*
Article from Nikkei Electronics; dated, Jan. 3, 2000; No. 760.
Japanese Office Action dated Mar. 30, 2004 with English translation of pertinent portions.
Japanese Office Action dated Dec. 3, 3003 with English translation of pertinent portions.
Portable Telephone in a Portable Audio Player, Mobile Media Magazine, Japan, Jan. 13, 2000, vol. 8, No. 2 pp. 46-47.
Lake Douglas "Contents Distribution in which the Network Distribution of Music Triggers an Explosion of Sudden Growth" Nikkei Network Buisness, Japan, Nikkei BP Co., Ltd., Dec. 15, 1999, vol. 54, pp. 136-139.
Homma et al. Distribution Record Companies Also Jump on Board; Year End Buisness War Heats Up; Nikke-Network Buisness; Japan; Nikkei BP Co., Ltd., Jul. 15, 199; No. 49; pp. 70-71.
Digicube, Music Distribution Business as the Company Base Point; Nikkei Network Buisness; Japan; Nikkei BP Co., Ltd., Oct. 15, 1999; No. 52; p. 13.

* cited by examiner

ONLINE DISTRIBUTION SYSTEM AND METHOD

BACKGROUND OF THE INVENTION

1. Field of the Invention

The present invention relates to an online distribution system wherein software such as a video or music is subscribed and distributed online between computers connected to each other over a circuit.

2. Description of the Related Art

In recent years, as use of digital videos has been and is increasing through a DVD recorder or a like apparatus, a software distribution service system for providing movie videos (movie software), music software and so forth online is getting popularized.

However, in order to utilize such a system as described above to download desired software in the form of digital data from a download terminal placed in a convenience store, a video and/or music rental shop or a like place, a user is obliged to search out a desired title from among a very large number of titles. As a result, much time is required to produce an intended medium.

SUMMARY OF THE INVENTION

It is an object of the present invention to provide an online distribution system and method by which the time required for a downloading procedure in a shop can be performed in a short time.

In order to attain the object described above, according to an aspect of the present invention, there is provided an online distribution system, comprising a search server, a data distribution server, a download terminal connected to the search server through the data distribution server, and a personal terminal to which the search server is connectable, the search server including a database for storing a plurality of titles of distribution information, title search means for searching the titles stored in the database for a title designated for subscription from the personal terminal, and subscription information storage means for storing the title searched out by the title search means and identification information transmitted from the personal terminal, the data distribution server including distribution information storage means for storing the distribution information, the download terminal including identification information acquisition means for acquiring identification information inputted from the outside, first readout means for reading out, based on the identification information acquired by the identification information acquisition means, the title stored in the subscription information storage means of the search server which corresponds to the identification information, second readout means for reading out the distribution information corresponding to the title read out by the first readout means from the distribution information storage means of the data distribution server, and recording means for recording the distribution information read out by the second readout means onto a recording medium.

The download terminal may further include settlement means for performing a settlement in regard to the transmission of the distribution information for the personal terminal.

The online distribution system may further comprise a cache server in which part of the distribution information stored in the distribution information storage means of the data distribution server is stored in advance. In this instance, the download terminal acquires, when the distribution information of the title corresponding to the identification information stored in the subscription information storage means of the search server is stored in the cache server, the distribution information from the cache server, but acquires, when the distribution information is not stored in the cache server, the distribution information from the distribution information storage means of the data distribution server.

According to another aspect of the present invention, there is provided an online distribution system, comprising a search server, a data distribution server, and a personal terminal connected to the data distribution server through the search server, the search server including a database for storing a plurality of titles of distribution information, title search means for searching the titles stored in the database for a title designated for subscription from the personal terminal, and subscription information storage means for storing the title searched out by the title search means, the data distribution server including distribution information storage means for storing the distribution information, title acquisition means for acquiring the title stored in the subscription information storage means of the search server, distribution information readout means for reading out the distribution information corresponding to the title acquired by the title acquisition means from the distribution information storage means, and transmission means for transmitting the distribution information read out by the distribution information readout means to the personal terminal.

The data distribution server may further include settlement means for performing a settlement in regard to the transmission of the distribution information for the personal terminal.

According to a further aspect of the present invention, there is provided an online distribution method for an online distribution system wherein a download terminal is connected to a search server through a data distribution server and the search server is connectable to a personal terminal, comprising the steps performed by the search server of storing a plurality of titles of distribution information into a database of the search server, searching the titles stored in the database for a title designated for subscription from the personal terminal, and storing the searched out title and identification information transmitted from the personal terminal as subscription information, the step performed by the data distribution server of storing the distribution information into distribution information storage means, and the steps performed by the download terminal acquiring identification information inputted from the outside, reading out, based on the acquired identification information, that one of the titles which corresponds to the identification information stored as the subscription information in the search server, reading out the distribution information corresponding to the readout title from the distribution information storage means of the data distribution server, and recording the read out distribution information onto a recording medium.

According to a still further aspect of the present invention, there is provided an online distribution method for an online distribution system wherein a personal terminal is connected to a data distribution server through a search server, comprising the steps performed by the search server of storing a plurality of titles of distribution information into a database of the search server, searching the titles stored in the database for a title designated for subscription from the personal terminal, and transmitting the searched out title to the data distribution server, and the steps performed by the data distribution server of storing the distribution information into distribution information storage means, reading out the distribution information corresponding to the title transmitted from the search server from the distribution information storage means, and transmitting the read out distribution information to the personal terminal.

With the online distribution systems and the online distribution methods, since distribution information corresponding to a desired title searched out and stored using a personal terminal of a user itself by the user in advance can be distributed at any time in response to a distribution request of the user, the user need not perform a search for a desired title in a shop. Consequently, an advantage that the time required for a download procedure in the shop can be decreased is anticipated.

Further, since a result of the search for the title performed by the user is registered together with identification information of the user in the search server, when the user issues a distribution request for the distribution data in the shop, only if the user inputs the identification information, the distribution information can be distributed. Consequently, another advantage that a medium or the like on which the result of the search need not be carried is anticipated.

Where a settlement function is provided for the settlement function, a self-service shop can be realized. Consequently, a further advantage that the cost in regard to the personal expenditure can be reduced is anticipated.

Where settlement means is provided for the data distribution server, a settlement can be performed online. Consequently, a still further advantage that the user need not perform a complicated procedure for payment is anticipated.

The above and other objects, features and advantages of the present invention will become apparent from the following description and the appended claims, taken in conjunction with the accompanying drawings in which like parts or elements are denoted by like reference symbols.

DESCRIPTION OF THE PREFERRED EMBODIMENT

Figure 1:
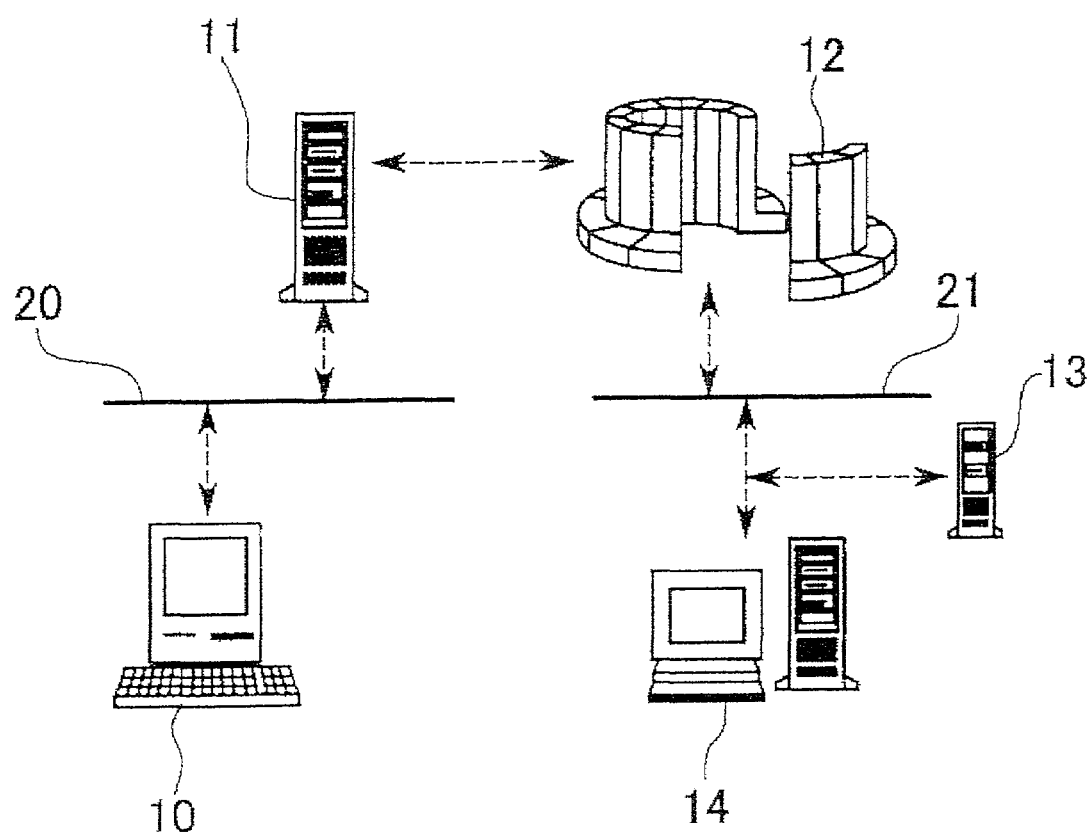
FIG. 1 is a schematic block diagram showing a configuration of an online distribution system to which the present invention is applied.

Referring to FIG. 1, there is shown an online distribution system to which the present invention is applied. A personal terminal 10 is connected to a search server 11 through the Internet 20 and transmits identification information for identification of a user and title data for indicating a title of movie or music software to the search server 11. The identification information includes a membership number set for each user and a password. The personal terminal 10 may be, for example, a computer, a WEB-accessible portable telephone terminal or the like.

The search server 11 includes a database which stores title data of a great number of pieces of software of movies, music, and so forth, and is connected to the personal terminal 10 through the Internet 20. The search server 11 further stores identification information transmitted from the personal terminal 10 and the title data in a coordinated relationship. The search server 11 is managed by a computer center (hereinafter referred to as "data center") installed in a dealer which sells software of movies, music and so forth, a rental shop which rents software of movies, music and so forth, or a like place.

The data center includes a video/music distribution server 12 connected to a private line and having an accessing function to the search server 11. The video/music distribution server 12 stores in advance a great number of video data and music data corresponding to titles of movies, music and so forth stored in the database of the search server 11 as distribution information (hereinafter referred to as "distribution data").

A cache server 13 is installed in several shops such as dealers and rental shops and is connected to the video/music distribution server 12 over a private line 21. The cache server 13 stores in advance some of the distribution data stored in the video/music distribution server 12. Some of the distribution data here signifies, for example, those video data or music data for which the demand is strong.

A download terminal 14 transmits not only a membership number and a password of a user inputted from an inputting section not particularly shown by a user to the search server 11 through the video/music distribution server 12, but also has a function of recording distribution data transmitted from the video/music distribution server 12 onto a recording medium. The download terminal 14 is installed in various shops such as dealers and rental shops similarly to the cache server 13 and is connected to the video/music distribution server 12 over the private line 21.

In the following, operation of the online distribution system having the configuration of FIG. 1 is described.

A user will first access the database of the search server 11 from the personal terminal 10 through the Internet 20 and searches for a desired title from among the title data of a large number of pieces of software of movies, music and so forth. If the desired title is searched out, then the user will designate the title and input a membership number and a password set for the user itself. The personal terminal 10 transmits the title designated by the user and the inputted membership number and password to the search server 11. The search server 11 stores the title and the inputted membership number and password transmitted thereto from the personal terminal 10.

Then, the user will go to a shop in which the cache server 13 and the download terminal 14 are installed, and input the membership number and the password set for the user itself to the download terminal 14. The download terminal 14 accesses the search server 11 through the video/music distribution server 12 and transmits the membership number and the password to the search server 11. When the membership number and the password are received from the download terminal 14, the search server 11 acquires a title from within the stored information based on the membership number and the password and transmits the acquired title to the download terminal 14 through the video/music distribution server 12.

The download terminal 14 thus acquires the title from the search server 11 and then accesses the cache server 13 to search whether or not distribution data corresponding to the title is stored in the cache server 13. If the distribution data corresponding to the title is stored in the cache server 13, then the download terminal 14 acquires the distribution data corresponding to the title from the cache server 13 and records the acquired distribution data onto a recording medium.

On the other hand, if video data or music data corresponding to the title is not stored in the cache server 13, the download terminal 14 accesses the video/music distribution server 12 to acquire distribution data corresponding to the title and records the acquired distribution data onto the recording medium. Consequently, moving picture information or music information of a movie, music or the like corresponding to the request of the user can be provided to the user based on the title stored in the search server 11 in advance.

The download terminal 14 may additionally have a settlement function of performing a settlement regarding provision of a recording medium. A self-service shop can thus be realized by performing a settlement through the download terminal 14 when a recording medium having video data or music data recorded thereon is provided to a user.

Otherwise, such a settlement function as described above may be incorporation into the data distribution server 12 such that video data or music data transmitted from the video/music distribution server12 may be transmitted directly to the personal terminal 10 without the intervention of the download terminal 14. This makes it possible for a user to acquire music or video data while the user is at the location where the personal terminal 10 is installed.

With the online distribution system described above, since an operation for searching for a title desired by a user is performed on the personal terminal 10, the communication charge involved in the search for a title on the data center can be reduced. Further, provision of the cache server 13 can decrease the data transmission time when compared with another case wherein distribution information is received from the video/music distribution server 12.

While the distribution in the online distribution system described above is video data and/or music data, it may otherwise be a program of game software or the like. In this instance, various titles of game software are stored in the database of the search server 11 in advance.

Further, while the identification information in the online distribution system described above is a membership number and a password set for each user, it may be any other information which can specify each user such as an address, the name, the age or a telephone number of the user.

While a preferred embodiment of the present invention has been described using specific terms, such description is for illustrative purposes only, and it is to be understood that changes and variations may be made without departing from the spirit or scope of the following claims.

What is claimed is:

1. An online distribution system, comprising:
   a search server;
   a data distribution server;
   a download terminal connected to said search server through said data distribution server;
   a personal terminal to which said search server is connectable;
   said search server including a database for storing a plurality of titles of distribution information, title search means for searching the titles stored in said database for a title designated for subscription from said personal terminal, and subscription information storage means for storing the title searched out by said title search means and identification information transmitted from said personal terminal;
   said data distribution server including distribution information storage means for storing the distribution information;
   said download terminal including identification information acquisition means for acquiring identification information inputted from the outside, first readout means for reading out, based on the identification information acquired by said identification information acquisition means, the title stored in said subscription information storage means of said search server which corresponds to the identification information, second readout means for reading out the distribution information corresponding to the title read out by said first readout means from said distribution information storage means of said data distribution server, and recording means for recording the distribution information read out by said second readout means onto a recording medium; and a cache server in which part of the distribution information stored in said distribution information storage means of said data distribution server is stored in advance, and wherein said download terminal acquires, when the distribution information of the title corresponding to the identification information stored in said subscription information storage means of said search server is stored in said cache server, the distribution information from said cache server, but acquires, when the distribution information is not stored in said cache server, the distribution information from said distribution information storage means of said data distribution server.

2. An online distribution system as claimed in claim 1, wherein said download terminal further includes settlement means for performing a settlement in regard to the transmission of the distribution information for said personal terminal.

* * * * *